United States Patent [19]
Betts et al.

[11] Patent Number: 5,812,075
[45] Date of Patent: Sep. 22, 1998

[54] COMBINED DAQ/RBS COMPENSATION SYSTEM AND METHOD FOR ENHANCING THE ACCURACY OF DIGITAL DATA COMMUNICATED THROUGH A NETWORK

[75] Inventors: William Lewis Betts, St. Petersburg; Keith Alan Souders, Tampa, both of Fla.

[73] Assignee: Paradyne Corporation, Largo, Fla.

[21] Appl. No.: 801,973

[22] Filed: Feb. 19, 1997

Related U.S. Application Data

[63] Continuation-in-part of Ser. No. 701,849, Aug. 23, 1996, Pat. No. 5,729,226, Ser. No. 702,023, Aug. 23, 1996, and Ser. No. 697,371, Aug. 23, 1996, Pat. No. 5,754,594.

[51] Int. Cl.$^6$ .................................................. H03M 13/00
[52] U.S. Cl. ........................... 341/94; 370/522; 370/523; 379/93; 395/182.02
[58] Field of Search .............................. 341/94; 370/522, 370/523; 379/93; 395/182.02, 182.04

[56] References Cited

U.S. PATENT DOCUMENTS

| | | | |
|---|---|---|---|
| 3,452,330 | 6/1969 | Avery | 371/32 |
| 4,529,979 | 7/1985 | Kusama et al. | 340/825.05 |
| 4,571,736 | 2/1986 | Agrawal et al. | 375/244 |
| 4,856,030 | 8/1989 | Batzer et al. | 375/222 X |
| 4,885,755 | 12/1989 | Yoshida | 375/222 X |
| 4,926,355 | 5/1990 | Boreland | 364/200 |
| 4,928,276 | 5/1990 | Blondeau, Jr. et al. | 370/110.1 |
| 5,027,356 | 6/1991 | Nakamura et al. | 371/32 |
| 5,263,081 | 11/1993 | Nightingale et al. | 379/90 |
| 5,282,197 | 1/1994 | Kreitzer | 370/76 |
| 5,406,583 | 4/1995 | Dagdeviren | 370/472 |
| 5,422,876 | 6/1995 | Turudic | 370/15 |
| 5,491,695 | 2/1996 | Meagher et al. | 370/112 |
| 5,506,956 | 4/1996 | Cohen | 395/182.04 |
| 5,528,579 | 6/1996 | Wadman et al. | 370/15 |
| 5,528,625 | 6/1996 | Ayanoglu et al. | 375/222 |
| 5,533,121 | 7/1996 | Suzuki et al. | 379/410 |
| 5,577,105 | 11/1996 | Baum et al. | 379/93 |
| 5,577,196 | 11/1996 | Peer | 395/182.02 |

OTHER PUBLICATIONS

"Digital Channel Bank Requirements and Objectives," Bell System Technical Reference (PUB 43801), AT&T, Nov. 1982.

*Primary Examiner*—Brian K. Young
*Assistant Examiner*—Jason L. W. Kost
*Attorney, Agent, or Firm*—Thomas, Kayden, Horstemeyer & Risley, L.L.P.

[57] ABSTRACT

A compensation system is configured to improve the accuracy of digital signals that are communicated through a digital network by reducing loss from digital attenuation quantization (DAQ; digital pad quantization) and rob bit signaling (RBS). The combined DAQ/RBS compensation system can be employed within a transmitting modem connected to the digital network and is constructed as follows. In a first embodiment, a first adjustment mechanism combines a DAQ compensation quantity with each segment of the digital data, prior to transmission, in order to enhance accuracy of the received digital data. The value of the DAQ compensation quantity depends on feedback that is provided to the compensation system during a series of test transmissions. Next, the word is communicated to a linear-mu-linear converter, which is configured to simulate a digital transmission by mu-law encoding each digital data word into a code word and then subsequently mu-law decoding each code word back into a linear digital data word, while taking into account the compensation quantity during the encoding/decoding process. In addition, the linear-mu-linear converter includes an RBS compensation system that causes an RBS compensation quantity to be mathematically combined with each segment to be tainted by RBS in order to enhance accuracy of the RBS segments, which typically occur periodically. A second adjustment mechanism is connected to the linear-mu-linear converter. The second adjustment mechanism combines the reciprocal of the DAQ compensation quantity with the linear data from the linear-mu-linear converter. Finally, the linear digital data word is passed from the linear-mu-linear converter to a linear-mu converter for conversion into a mu-law code word and transmission to the network. In a second embodiment of the combined DAQ/RBS system, the RBS compensation system is not implemented within, but after, the linear-mu-linear converter.

17 Claims, 6 Drawing Sheets

COMBINED DAQ/RBS COMPENSATION SYSTEM AND METHOD FOR ENHANCING THE ACCURACY OF DIGITAL DATA COMMUNICATED THROUGH A NETWORK

This subject matter of this document is a continuation-in-part of and claims priority to the following copending and commonly assigned U.S. patent applications, all of which are incorporated herein by reference: (a) application entitled, "Rob Bit Compensation System And Method Associated With A Transmitter Or Codec," filed Aug. 23, 1996, and assigned Ser. No. 08/701,849, now U.S. Pat. No. 5,729,226; (b) application entitled, "Noncooperative Feedback System And Method For A Compensation System Associated With A Transmitter Or Codec," filed Aug. 23, 1996, and assigned Ser. No. 08/702,023; and (c) application entitled, "Cooperative Feedback System And Method For A Compensation System Associated With A Transmitter Or Codec," filed Aug. 23, 1996, and assigned Ser. No. 08/697,371, now U.S. Pat. No. 5,754,594.

FIELD OF THE INVENTION

The present invention generally relates to data communications and, more particularly, to a compensation system and method for improving the accuracy of digital data that is communicated through a network, for example but not limited to, a telephonic network. In essence, the compensation system and method are employed in connection with the digital data transmitted to a network, prior to transmission, in order to increase the accuracy of the digital data that is ultimately received from the network by minimizing loss, or error, caused by digital attenuation quantization (DAQ) and rob bit signaling (RBS).

BACKGROUND OF THE INVENTION

A telephone network is often used as an interface between communication devices, such as modulators/demodulators (modems). Some modems are digital in nature and others are analog. Specifically, a digital modem is a device that communicates digital data by using digital signals that replicate analog waveforms. In contrast, an analog modem is a device that communicates digital data by encoding the data on analog waveforms.

FIG. 1 shows a typical telephone network 99 for interconnecting a digital modem 101 and an analog modem 102. The digital modem 101 is usually interconnected with a digital network 113 via digital connections 112$a$, 112$b$. For instance, the digital modem 101 may be interconnected to a digital network 113, such as a public switch telephone network (PSTN), via a Local Exchange Carrier (LEC) subscriber loop. The digital network 113 may comprise, among other things, a T1 carrier system, a basic rate or primary rate Integrated Services Digital Network (ISDN), a fiber optic cable network, a coaxial cable network, a satellite network, or even a wireless digital communications network. Communications over the digital network 113 are conducted in accordance with a pulse code modulation (PCM) scheme. Channel capacity through these digital facilities is typically between 56 and 64 kilobits per second (kb/s). Coding of the signals is also employed so that compression and a constant signal/distortion performance over a wide dynamic range is achieved for optimal transmission of voice signals.

A commonly used coding technique is nonlinear mu-law coding. The linear amplitude L corresponding with each code word is encoded, or converted to, a mu-law code word by the following equation:

$$M=(L+33)*2^{8-N} \quad \text{(Eq. 1)}$$

where M is the mu-law magnitude (e.g., 4 bits), L is the linear amplitude (e.g., 14 bits), and N is the mu-law segment, or segment (e.g., 3 bits). The mu-law code word is decoded, or converted to, a linear code word as follows:

$$L=\{(2M+33)2^N-33\} \quad \text{(Eq. 2)}$$

The digital network 113 is in turn interconnected with another LEC subscriber loop that includes a coder/decoder (codec) 106. The codec 106 is interconnected with the digital network 113 via digital connections 114$a$, 114$b$. The codec 106 is often situated at a telephone company office or along a street near the analog modem subscriber in a subscriber loop carrier (SLC) device. The codec 106 provides an interface between the digital network 113 and an analog telephone connection 118, sometimes referred to as a copper loop. For communications in the direction from the digital network 113 to the analog modem 102, the codec 106 includes a mu-linear digital-analog converter (DAC) 109. The converter 109 converts nonlinear mu-law levels to a linear analog signal.

For communications in the direction from the analog modem 102 to the digital network 113, the codec 106 includes a linear-mu analog-digital (ADC) converter 107. The converter 107 converts the linear analog signal to nonlinear mu-law code words.

A hybrid 103 is in communication with the DAC and ADC via respective low pass filters (LPFs) 111, 105. The hybrid 103 serves to separate the bidirectional analog signals from the analog telephone connection 118 into unidirectional transmit and receive analog signals sent to and received from the ADC 107 and the DAC 109, respectively.

Furthermore, the analog modem 102 is connected to the analog telephone connection 118 and communicates analog signals therewith. Thus, communications occur between the digital modem 101 and the analog modem 102 by way of the digital network 113 and the codec 106.

The encoding and decoding processes that are imposed upon a communication signal adversely create a certain amount of error in the ultimately received signal due to digital attenuation quantization (DAQ), or digital pad quantization. This quantization error inherently results from the fact that the original data signal typically is defined by a larger number of bits than the mu-law code that is derived therefrom, transmitted, and then decoded. Therefore, when the mu-law code is decoded into the received signal, the received signal does not exactly match the transmitted signal due to quantization error. In most connections, the digital network 113 attenuates signals transmitted on connection 114$b$ to codec 106. These signals are digital and are converted to linear format, then attenuated, and finally converted back to mu-law format. This second mu-law conversion introduces a second quantization error. DAQ loss undesirably causes the distortion of the received signal to increase and the performance of the communications system to decrease.

DAQ loss becomes significantly worse when the common technique of loss insertion is used to mitigate the adverse effects of echo produced at hybrids 103 of FIG. 1. Loss insertion is used in the PSTN to control echo impairment during speech calls through a reduction in the signal amplitude of the transmitted analog signal, and hence, a corresponding reduction in the distortion amplitude. When a signal is to be transmitted over the network 113, a standardized transmission loss (typically, 6 decibels (dBs) for most networks, and 3 dB for the rest) is purposefully inserted into the signal path. The signal amplitude of the received signal is then recovered in the called party's modem via a well known equalization process which scales the signal amplitude back up to its expected level.

In addition to loss resulting from DAQ, loss can also result from a method known as rob bit signaling (RBS). RBS is utilized in the digital network 113 to communicate on-hook/off-hook status between the modems 101, 102 and the digital network 113. RBS forces the least significant bit (LSB) of every nth segment, where n is typically 6 or 24, to a constant logic level, either logical 1 or 0. Unfortunately, RBS causes the block error rate of data transfers to increase and the peak error to increase from 0.5 LSB to 1.5 LSB. RBS can occur in the network before and/or after DAQ.

Hence, there exists a need in the industry for an improved compensation system and method to minimize both the DAQ loss (which loss is made worse by use of digital loss insertion techniques) and RBS loss imposed upon digital data that is transmitted through a digital network.

SUMMARY OF THE INVENTION

The invention provides for a compensation system and method that can be implemented in a transmitter, for compensating digital data prior to transmission through a network, for example, a telephone network, in order to improve the accuracy of the digital data that is ultimately received from the network by minimizing the error imposed upon the data by digital attenuation quantization (DAQ) and rob bit signaling (RBS).

In terms of architecture, the combined DAQ/RBS compensation system can be employed within a transmitting device, such as a modem, connected with the network. Two embodiments of the compensation system are described herein, and one may be preferred over the other, depending upon whether RBS occurs before or after DAQ in the network. If desired, both embodiments could be implemented in a single transmitter, and then one or both could be selected and used for operation, based upon feedback received during a test/training session.

In the first embodiment of the combined DAQ/RBS compensation system, a first adjustment mechanism, for example, a multiplier, is configured to mathematically combine a DAQ compensation quantity with each segment of the digital data, prior to transmission, in order to enhance accuracy of the received digital data. As an example, a quantity of 1, $1/\sqrt{2}$, or ½ may be multiplied with each segment, depending on feedback that is provided to the compensation system during a series of training or test transmissions. After the DAQ compensation quantity is mathematically combined with the digital data word, the word is communicated to a linear-mu-linear converter, which is configured, in general, to simulate a digital transmission by encoding (e.g., mu-law encoding) each digital data word into a code word and then subsequently decoding (e.g., mu-law decoding) each code word back into a linear digital data word, while taking into account the DAQ compensation quantity during the encoding/decoding process.

In addition, the linear-mu-linear converter includes an RBS compensation system that causes an RBS compensation quantity to be mathematically combined with each RBS segment in order to enhance accuracy of the RBS segments, which typically occur periodically. Application of the RBS compensation corresponds with the frequency of the RBS segments. As an example, one-half of an least significant bit (LSB) may be added to each RBS segment when the RBS logic state is a mark (logical 1), or alternatively, one-half of an LSB may be subtracted from (i.e., add 2's complement) each RBS segment when the RBS logic state is a space (logical 0). A feedback system advises the combined DAQ/RBS compensation system as to which segments of outgoing digital data are to have a bit eventually robbed therefrom by the digital network. A second adjustment mechanism, for example, a multiplier, is connected to the linear-mu-linear converter. The second adjustment mechanism mathematically combines the reciprocal of the DAQ compensation quantity G with the linear data from the linear-mu-linear converter. Finally, the linear digital data word is passed from the linear-mu-linear converter to a linear-mu converter for conversion into a mu-law code word and transmission to the network. In this way, the loss experienced by the digital data during quantization, RBS, and transmission through the network merely returns the digital data close to its original precompensated state, resulting in an ultimate received digital output signal with minimal error due to DAQ and RBS.

The second embodiment of the combined DAQ/RBS compensation system has similar architecture to the first embodiment in that the second embodiment comprises a first adjustment mechanism, a linear-mu-linear converter, and a second adjustment mechanism. However, in the second embodiment, the RBS compensation system is not implemented in the linear-mu-linear converter, but is situated after the linear-mu-linear converter, specifically, between the linear-mu converter and the network.

The invention can also be viewed as providing a method for reducing DAQ loss and RBS loss imposed upon digital data that is communicated through a network. In this regard, the method can be broadly summarized as follows: modifying digital data, prior to transmission, so that DAQ loss that is subsequently imposed upon the digital data by a network is reduced by mathematically combining a DAQ compensation quantity to each segment of the digital data; modifying the digital data, prior to transmission, so that loss resulting from RBS in the network is reduced by mathematically combining an RBS loss compensation quantity with each segment of the digital data that will be modified by RBS; and transmitting the modified digital data to the network.

The invention has numerous advantages, a few of which are delineated hereafter, as merely examples.

An advantage of the invention is that it increases the accuracy of digital data communicated through a network by decreasing the amount of error imposed upon the data by both DAQ and RBS.

Another advantage of the invention is that it provides for an optimal implementation (first or second embodiment) for minimizing both DAQ and RBS, the implementation depending upon the order in which DAQ and RBS are implemented in the network. Both embodiments could be implemented in a transmitter, and then one or both could be selected and used for operation, based upon feedback received during a test/training session.

Another advantage of the invention is that data transfer rates of digital data through a network are increased.

Another advantage of the invention is that it can be implemented in any system where DAQ loss and RBS are imposed upon the digital data. Thus, the invention may be employed in, for example, a digital modem, an analog modem, etc.

Another advantage of the invention is that it reduces the RBS induced peak error in a signal that is passed through a digital network that practices RBS from 1.5 LSB to 1.0 LSB.

Another advantage of the invention is that it can detect any number and frequency of RBS frames, even when the digital network includes a plurality of subnetworks, each of which robs its own bit.

Another advantage of the invention is that the data rate of modem communications can be increased from 28,800 b/s to at least 33,600 b/s.

Another advantage of the invention is that for modems operating at 33,600 bits per second (B/S), the invention reduces the block error rate from at least 0.03 to 0.003 and typically achieves a factor of 10× improvement.

Another advantage of the invention is that it can be implemented with software, hardware, or a combination thereof. Preferably, the invention is implemented in software that is stored in memory and that configures and drives a conventional digital signal processor (DSP).

Another advantage of the invention is that it is simple in design, easily implemented in existing modems, and is reliable in operation.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

The invention provides for a combined DAQ/RBS compensation system 130 (FIGS. 2A and 2B) and associated methodology that can be employed in connection with digital data that undergoes digital attenuation quantization (DAQ) loss and rob bit signaling (RBS) loss when passed through an electronic communication system or network (e.g., PSTN). In essence, the combined DAQ/RBS compensation system 130 minimizes the error in the ultimately received digital data that is attributable to DAQ and RBS. Although not required to practice the present invention, the combined DAQ/RBS compensation system 130 (FIGS. 2A and 2B) and method of the preferred embodiment are implemented in a transmit subsystem of a digital modem that is connected to a telephonic digital network, which imposes the DAQ and RBS losses, in order to reduce error in the digital data in a receive subsystem of an analog modem that receives the digital data by way of an analog signal from a telephone line.

A. Combined DAQ/RBS Compensation Method

The unique methodologies employed by the first and second embodiments of the combined DAQ/RBS compensation system 130 (FIGS. 2A and 2B, respectively) are broadly summarized, in mathematical terms, as follows. One embodiment may be preferred over the other, depending upon whether RBS occurs before or after DAQ in the network 113.

1. First Embodiment

Figure 2A:
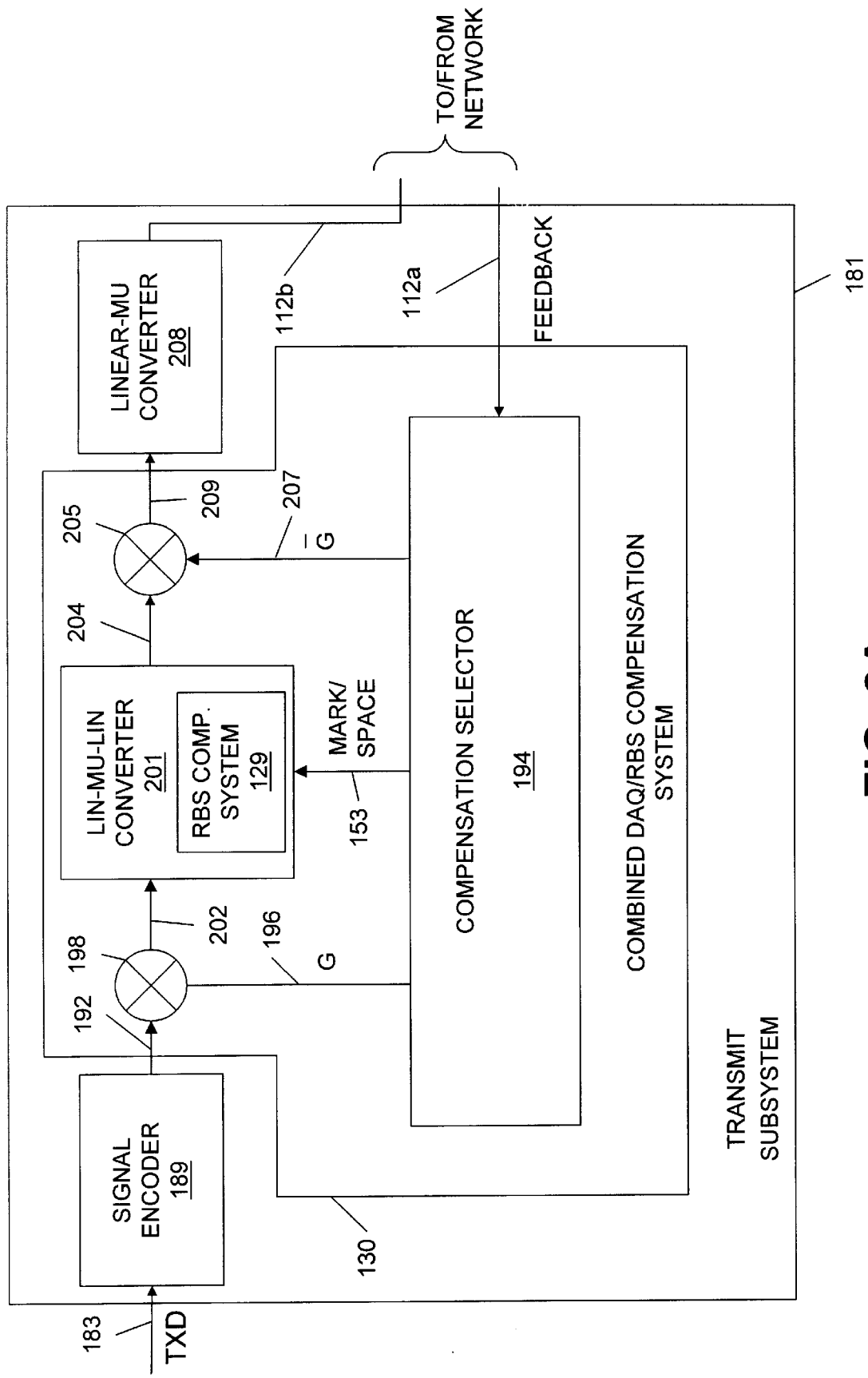
FIG. 2A is an electronic block diagram of a possible implementation of a transmit subsystem within the digital modem of FIG. 1 that employs a first embodiment of the combined DAQ/RBS compensation system of the present invention.

The following discussion pertains to the first embodiment of the combined DAQ/RBS compensation system 130 (FIG. 2A). Initially, the linear data word L is encoded, or converted to, a mu-law code word by the following equation:

$$M=(G*L+33)*2^{8-N} \tag{Eq. 3}$$

where M is the mu-law code word (e.g., 4 bits), G is a DAQ compensation quantity (e.g., 14 bits), L is the linear data word (e.g., 14 bits), and N is the mu-law segment, or segment identification (e.g., 3 bits). The DAQ compensation quantity G can be preset in some implementations, but its value is selected during an initialization phase from a library of possible values in the preferred embodiments by the combined DAQ/RBS compensation system 130 based upon feedback that is communicated to the combined DAQ/RBS compensation system 130.

Then, if RBS is anticipated on this sample based upon feedback, the mu-law code word is modified as follows:

$$M=M+0.5 \; LSB \text{ if RBS forces a space LSB} \tag{Eq. 4a}$$

$$M=M-0.5 \; LSB \text{ if RBS forces a mark LSB} \tag{Eq. 4b}$$

Moreover, if during this step, overflow occurs (i.e., addition of the 0.5 LSB causes a shift into another segment), then N is incremented, or N=N+1.

Next, the mu-law code word is converted back to a linear data word as follows:

$$L=\{(2M+33)2^N-33\} \tag{Eq. 5}$$

Finally, the combined DAQ/RBS compensation system 130 (FIG. 2A) passes the linear data words to a mu-law encoder where the original gain of the signal is restored and where mu-law code words are produced for transmission, as indicated mathematically as follows:

$$M=(L/G+33)*2^{8-N} \tag{Eq. 6}$$

2. Second Embodiment

Figure 2B:
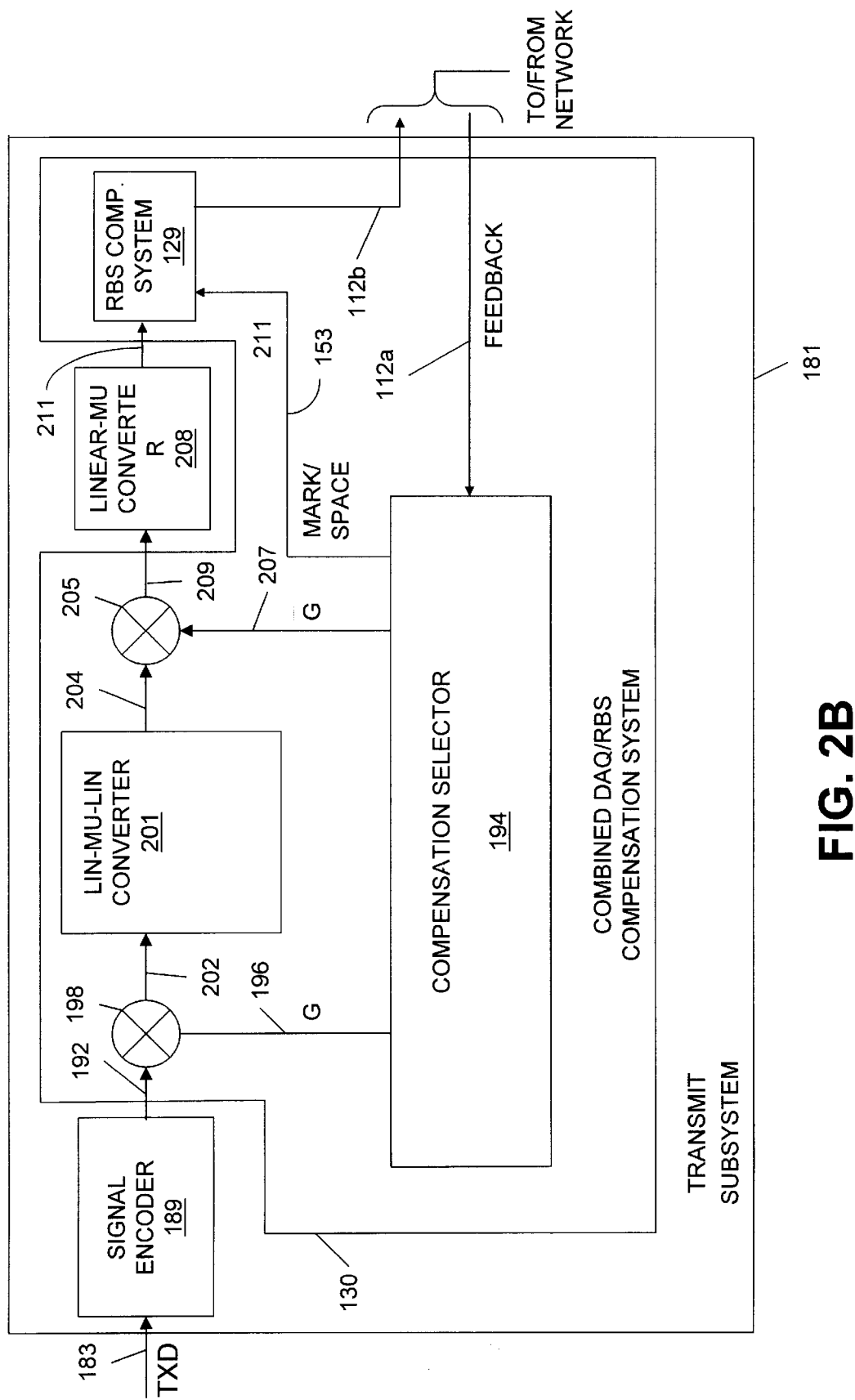
FIG. 2B is an electronic block diagram of a possible implementation of a transmit subsystem within the digital modem of FIG. 1 that employs a second embodiment of the combined DAQ/RBS compensation system of the present invention.

The following discussion pertains to the second embodiment of the combined DAQ/RBS compensation system 130 (FIG. 2B). Initially, the linear data word L is encoded, or converted to, a mu-law code word by the following equation:

$$M = (G*L + 33) * 2^{8-N} \quad \text{(Eq. 7)}$$

where M is the mu-law code word (e.g., 4 bits), G is a DAQ compensation quantity (e.g., 14 bits), L is the linear data word (e.g., 14 bits), and N is the mu-law segment, or segment identification (e.g., 3 bits).

Next, the mu-law code word is converted back to a linear data word as follows:

$$L = \{(2M+33)2^N - 33\} \quad \text{(Eq. 8)}$$

Finally, the combined DAQ/RBS compensation system 130 (FIG. 2B) passes the linear data words to a mu-law encoder where the original gain of the signal is restored and where mu-law code words are produced, as indicated mathematically as follows:

$$M = (L/G + 33) * 2^{8-N} \quad \text{(Eq. 9)}$$

Then, if RBS is anticipated on this sample based upon feedback, the mu-law code word is modified as follows:

$$M = M + 0.5 \; LSB \text{ if RBS forces a space LSB} \quad \text{(Eq. 10a)}$$

$$M = M - 0.5 \; LSB \text{ if RBS forces a mark LSB} \quad \text{(Eq. 10b)}$$

Moreover, if during this step, overflow occurs (i.e., addition of the 0.5 LSB causes a shift into another segment), then N is incremented, or N=N+1.

B. Combined DAQ/RBS Compensation System

Figure 1:
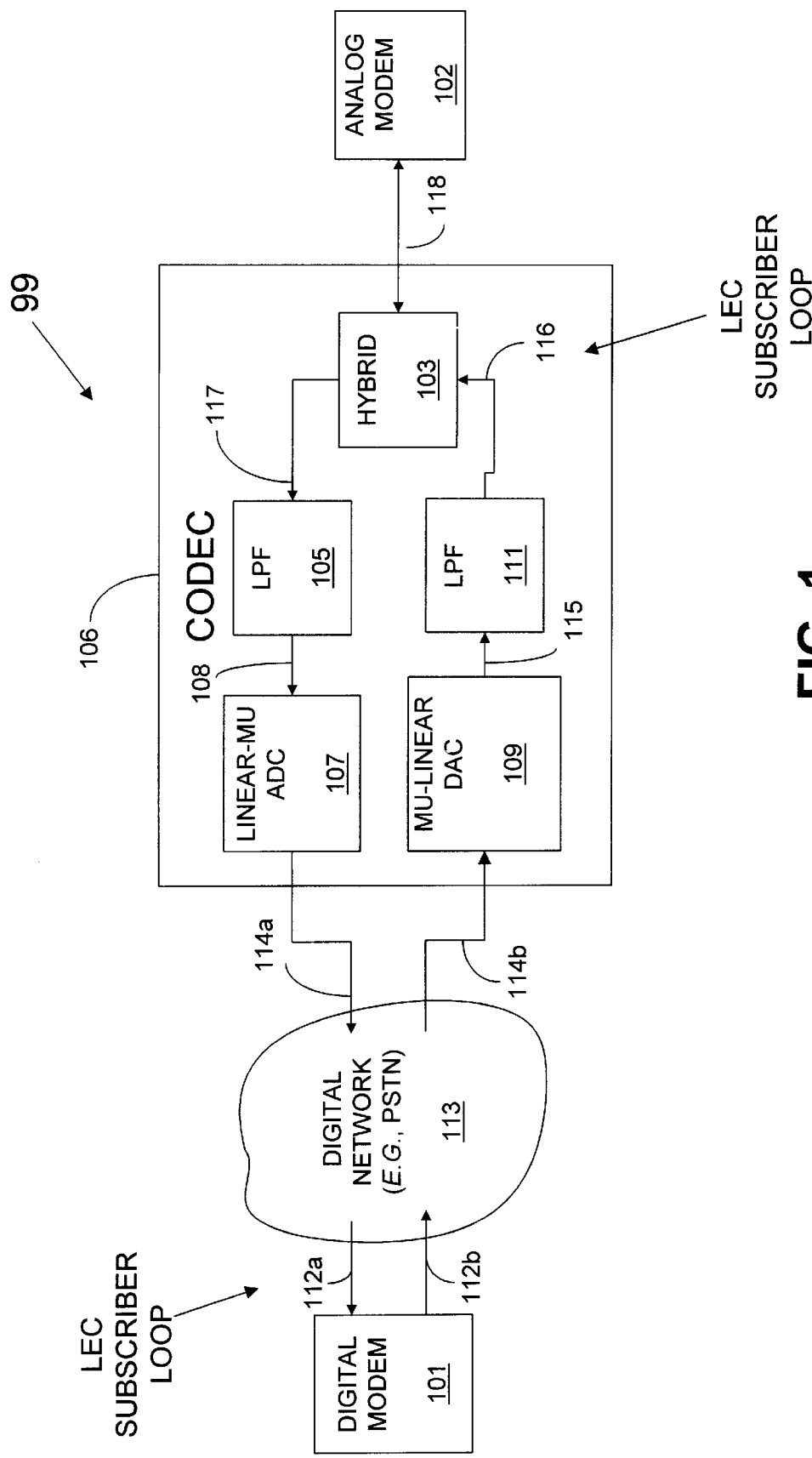
FIG. 1 is an electronic block diagram of a possible implementation for coupling together digital and analog modems over a digital network.

The architecture of the combined DAQ/RBS compensation system 130 will now be described hereafter with reference to FIGS. 2 through 5. In the preferred embodiment, the combined DAQ/RBS compensation system 130 is implemented in the digital modem 101 (FIG. 1) in order to compensate for and minimize the distortion imposed upon the digital data resulting from quantization and RBS imposed by the digital network 113 (FIG. 1). However, as can be appreciated by one ordinarily skilled in the art, the combined DAQ/RBS compensation system 130 may be employed in association with other transmission or transmitter devices and in connection with other types of systems that impose DAQ loss and/or RBS loss.

1. First Embodiment

A first embodiment of the combined DAQ/RBS compensation system 130 will now be described with reference to FIG. 2A. FIG. 2A generally shows an electronic block diagram of a possible implementation of a transmit subsystem 181 that can be situated within the digital modem 101 (FIG. 1) for receiving transmit data 183 from local data terminal equipment (DTE) and communicating it to the digital network 113 (FIG. 1). The elements of the transmit subsystem 181 as well as the combined DAQ/RBS compensation system 130 can be implemented in software, firmware, hardware, or a combination thereof. In the preferred embodiment, the elements of the transmit subsystem 181 as well as the combined DAQ/RBS compensation system 130, as shown in FIG. 2, are implemented in software that is stored in memory and that configures and drives a conventional digital signal processor (DSP). The architecture and functionality of DSPs are well known in the art.

Referring to FIG. 2A, the transmit subsystem 181 communicates the transmit data in the form of a binary bit stream from the local DTE to a signal encoder 189 along path 183. The signal encoder 189 is configured to modulate and/or process the transmit data. For this purpose, the encoder 189 may implement, for example, a serial-parallel converter, a filter, a scrambler, a trellis encoder, a modulator, etc., all of which are well known in the art. The signal encoder 189 can employ any suitable modulation and/or signal processing techniques, for example, those recommended by the conventional V.34 standard. When the encoder 189 employs V.34 modulation and signal processing, the data that is output from the signal encoder 189 complies with the well known V.34 protocol so that the data stream corresponds with one of fourteen possible V.34 speeds between 2,400 b/s and 33,600 b/s, inclusive.

The signal encoder 189 drives the linear digital signal to the combined DAQ/RBS compensation system 130 via path 192. In architecture, the combined DAQ/RBS compensation system 130 includes a compensation selector 194. The compensation selector 194 is configured to receive a feedback signal(s) on connection 112a. The compensation selector 194 processes and decodes the feedback signal to determine the appropriate compensation quantity G to be selected and transmits this quantity G along path 196 to an adjustment mechanism 198, for example but not limited to, a multiplier. From the feedback signal, the compensation selector 194 also identifies RBS segments and whether or not the RBS imposes a mark or space. The foregoing information is forwarded to the linear-mu-linear converter 201, as indicated by reference arrow 153 and as described in more detail hereafter.

As examples of systems for producing the feedback signal(s), a cooperative feedback system 210 and a noncooperative feedback system 240 are described in further detail hereinafter with reference to FIGS. 4 and 5, respectively. Either of these systems 210, 240 can be utilized to produce a suitable feedback signal(s) to assist the combined DAQ/RBS compensation system in selecting an appropriate DAQ compensation quantity G during the initialization phase.

In the combined DAQ/RBS compensation system 130 of FIG. 2A, an adjustment mechanism 198 is configured to combine the compensation quantity G with each segment of the incoming digital data. In the preferred embodiment, this is accomplished by mathematically multiplying each segment of the digital data by the selected DAQ compensation quantity G. In the context of equation (3), this process produces the value (G*L). As mentioned, the combined DAQ/RBS compensation system 130 of the preferred embodiment receives feedback during an initialization phase for aiding it in selecting and utilizing an appropriate DAQ compensation quantity G for typical steady state operation.

Each compensated data segment of digital data is then relayed to the linear-mu-linear converter 201 along path 202. The linear-mu-linear converter 201 first encodes each digital data segment (e.g., 14 bits) into a mu-law code word (e.g., 4 bits) according to equation (3). If the segment is an RBS segment, then an RBS compensation quantity is mathematically combined with the segment in order to minimize the effects of RBS. In the preferred embodiment, 0.5 LSB is added or subtracted from the segment, depending upon whether the RBS imposes a space LSB or a mark LSB, respectively. If overflow occurs, then the segment indicator N is incremented, or N=N+1.

Figure 3:
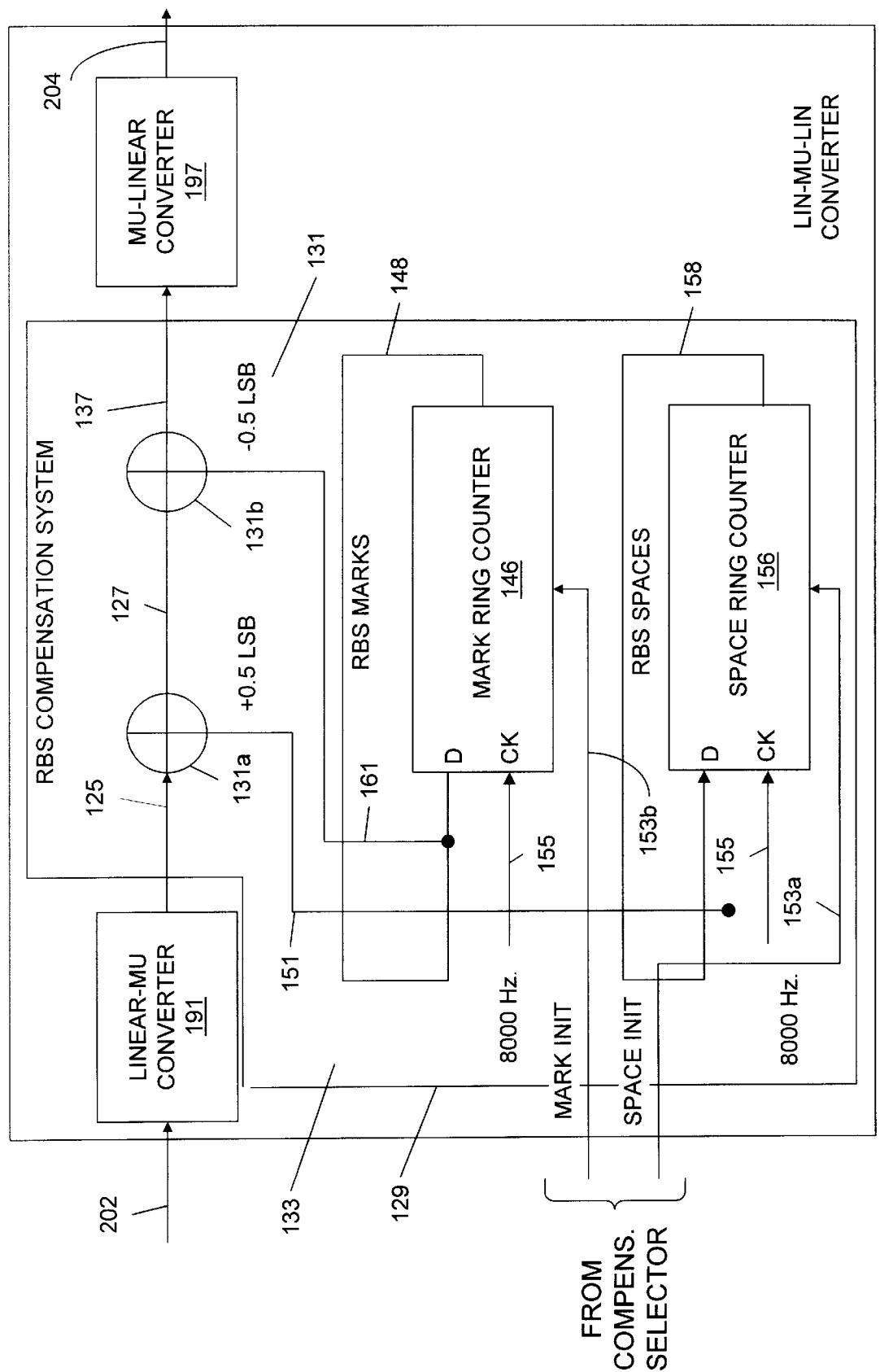
FIG. 3 is an electronic block diagram of a possible implementation of the RBS compensation system of FIGS. 2A and 2B.

Referring to FIG. 3, the preferred embodiment of the linear-mu-linear converter 201 includes a linear-mu converter 191, which is configured to convert the incoming linear code word to a mu-law code word. A compensation addition mechanism 131 receives the mu-law code word from the linear-mu converter 191. The mechanism 131 includes successive adders 131a, 131b and is controlled by a compensation control 133. Generally, the compensation addition mechanism 131 receives successive mu-law code words 125 from the converter 191 and to each, it performs one of the following: (a) mathematically combines a zero with the code word 125 to produce a modified code word 137 (i.e., effectively, forwards the code word 125 unchanged but with an additional bit); (b) adds 0.5 LSB to the code word 125 in order to produce a modified code word 137; or (c) subtracts 0.5 LSB (i.e., adds 2's complement of 0.5 LSB, or −0.5 LSB) to the code word 125 in order to produce a modified code word 137. In order to accomplish the aforementioned functionality, the adder 131a of the compensation addition mechanism 131 is configured to add either nothing or +0.5 LSB to each code word 125 in order to generate the modified code word 137, while similarly, the adder 131b is configured to add either nothing or −0.5 LSB to each code word 127 in order to generate the modified code word 137. The foregoing functionality is in accordance with equations (4a) and (4b) discussed hereinbefore.

The compensation control 133 controls the adders 131a, 131b, as indicated by respective reference arrows 151, 161, to accomplish one of the aforementioned options. Furthermore, the compensation control 133 is configured to receive space and mark initialization signals 153a, 153b, which are essentially a bit pattern that identifies which segments are RBS segments. Based upon the foregoing initialization signals 153a, 153b, the compensation control 133 detects when an RBS segment occurs and is configured to advise the compensation addition mechanism 131 when to combine a quantity (i.e., to effectively add or subtract an amount) with the RBS segment in order to enhance the accuracy of the RBS segment.

In architecture, the compensation control 133 of the combined DAQ/RBS compensation system 130 has mark RBS logic for identifying an RBS segment having an LSB that is a mark and space RBS logic for identifying an RBS segment having an LSB that is a space. The space and mark RBS logic mechanisms generate respective control signals 151, 161 for the compensation addition mechanism 131. The signals 151, 161 are indicative of whether or not there is an RBS segment and whether the RBS segment either has a space LSB or a mark LSB, respectively.

The mark RBS logic includes a mark ring counter 146. The mark ring counter 146 is a shift register or other suitable mechanism. The mark ring counter 146 is configured to receive its own output at its data terminal (D). The mark ring counter 146 is preset so that all states match the mark initialization word 153b and is clocked by a clock signal 155 at a rate of preferably 8000 hz to correspond with the segment frequency rate of the incoming signal 125.

In the preferred embodiment, the mark ring counter 146 is an n state device, where n represents the frequency of the RBS segment. Typically, n is 6, 12, or 24. The mark ring counter 146 is shifted one state of n states every segment. In FIG. 3, the mark ring counter 146 shifts to the left so that the most significant bit (MSB) is output at reference arrow 148. When RBS compensation should be applied, the mark ring counter output (i.e., the most significant bit (MSB) of the stored word) exhibits a logical 1, and automatically tracks the RBS segments that have a mark LSB.

The space RBS logic identifies RBS segments having an LSB that exhibits a space. The space RBS logic includes a space ring counter 156. The space ring counter 156 is a shift register or other suitable mechanism. The space ring counter 156 is configured to receive its own output at its data terminal (D). The space ring counter 156 is preset so that all states match the space initialization (INIT) word 153a and is clocked by a clock signal 155 at a rate of preferably 8000 hz to correspond with the segment frequency rate of the incoming digital data 125.

In the preferred embodiment, just as with the mark ring counter 146, the space ring counter 156 is an n state device, where n represents the frequency of the RBS segment, and the space ring counter 156 is shifted one of n states every segment. In FIG. 3, the space ring counter 156 shifts to the left so that the MSB is output at reference arrow 158. When space RBS compensation should be applied, the space ring counter 156 output (i.e., the most significant bit (MSB) of the stored word) exhibits a logical 1 and automatically tracks the RBS segments that have a space LSB.

Each mu-law code word 137 is forwarded to a mu-linear converter 197, which device is well known in the art and which converts each mu-law code word back to linear format 204.

As a result of the RBS compensation system 129 in FIG. 3, the transmit subsystem can encode each RBS segment so that the maximum possible error in each RBS segment at a receiver is no greater than 1.0 LSB. The possible maximum error in an RBS segment resulting from the encoding/decoding process of the prior art is 1.5 LSB. Almost needless to say, modem performance is significantly improved by the invention during an RBS segment.

Further note that multiple RBS bits can occur as the signal passes through multiple switches, multiplexers, or subscriber loop carriers (SLC) associated with the digital network 113. The ring counters 146, 156 can monitor and compensate for RBS in multiple bit positions.

In accordance with another feature of the invention, in order to save on processing time, the linear-mu-linear converter 201 may be configured to manipulate only a particular field of each segment, while tracking the other fields, and reconstructing the segment at the end for output. In this regard, each incoming segment typically has three fields: (a) a sign field, (b) a segment field (essentially, a gain); and (c) a quantized code field. The sign and segment fields are left unchanged and are tracked, while the quantized code word field is manipulated by the RBS compensation quantity. Then, after the RBS compensation quantity has been introduced, the sign and segment fields are re-attached. This feature saves processing time and complexity.

Once processing in the linear-mu-linear converter 201 is complete, the DAQ compensation quantity G (previously multiplied with the digital data prior to the conversion of the digital data in the linear-mu-linear converter 201) is removed from the segment of digital data. In the preferred embodiment, this is accomplished by relaying each digital data segment along path 204 to an adjustment mechanism 205, for example but not limited to, a multiplier, and by communicating along path 207 the reciprocal of the previous DAQ compensation quantity G to the adjustment mechanism 205. In the context of equation (6), this procedure is directed to deriving the quantity L/G. By multiplying the reciprocal with the digital data segment, the adjustment mechanism 205 effectively removes the DAQ compensation quantity G previously multiplied with the digital data in adjustment mechanism 198. This leaves the digital data in a modified form that will be returned to near its original state after it experiences the DAQ and RBS associated with the digital network 113.

Having compensated the digital data for DAQ loss and RBS loss, the digital data is next communicated from the combined DAQ/RBS compensation system 130 to a linear-mu converter 208 via path 209, before it is transmitted to the digital network 113 along path 112b. The linear-mu converter 208, another device which is well known in the art, converts each incoming linear data word to a mu-law code word in accordance with equation (6) and transfers each mu-law code word to the digital network 113 (FIG. 1) via connection 112b.

2. Second Embodiment

A second embodiment of the combined DAQ/RBS compensation system 130 will now be described with reference to FIG. 2B. FIG. 2B shows a transmit subsystem corresponding with that of FIG. 2A and, for the sake of simplicity, the discussion set forth previously relative to FIG. 2A is incorporated herein by reference and is equally applicable to FIG. 2B.

In the second embodiment of the combined DAQ/RBS compensation system 130 of FIG. 2B, the adjustment mechanism 198 is configured to combine the compensation quantity G with each segment of the incoming digital data. In the preferred embodiment, this is accomplished by mathematically multiplying each segment of the digital data by the selected DAQ compensation quantity G. In the context of equation (7), this process produces the value (G*L). As mentioned, the combined DAQ/RBS compensation system 130 of the preferred embodiment receives feedback during an initialization phase for aiding it in selecting and utilizing an appropriate DAQ compensation quantity G for typical steady state operation.

Each compensated data segment of digital data is then relayed to the linear-mu-linear converter 201 along path 202. The linear-mu-linear converter 201 first encodes each digital data segment (e.g. 14 bits) into a mu-law code word (e.g., 4 bits) according to equation (7).

Referring to FIG. 3, the preferred embodiment of the linear-mu-linear converter 201 of the second embodiment includes a linear-mu converter 191, which is configured to convert the incoming linear code word to a mu-law code word 125. Each mu-law code word 125 is forwarded to a mu-linear converter 197, which device is well known in the art and which converts each mu-law code word 125 back to linear format 204.

Once processing in the linear-mu-linear converter 201 is complete, the DAQ compensation quantity G (previously multiplied with the digital data prior to the conversion of the digital data in the linear-mu-linear converter 201) is removed from the segment of digital data. In the preferred embodiment, this is accomplished by relaying each digital data segment along path 204 to an adjustment mechanism 205, for example but not limited to, a multiplier, and by communicating along path 207 the reciprocal of the previous DAQ compensation quantity G to the adjustment mechanism 205. In the context of equation (9), this procedure is directed to deriving the quantity L/G. By multiplying the reciprocal with the digital data segment, the adjustment mechanism 205 effectively removes the DAQ compensation quantity G previously multiplied with the digital data in adjustment mechanism 198. This leaves the digital data in a modified form that will be returned to near its original state after it experiences the DAQ associated with the digital network 113.

Having compensated the digital data for DAQ loss and RBS loss, the digital data is next communicated from the combined DAQ/RBS compensation system 130 to a linear-mu converter 208 via path 209, before it is transmitted to the digital network 113 along path 112b. The linear-mu converter 208, another device which is well known in the art, converts each incoming linear data word to a mu-law code word in accordance with equation (9) and transfers each mu-law code word to the RBS compensation system 129, as illustrated in FIG. 2B. The mu-law code word on line 211 contains one extra LSB to facilitate the RBS compensation.

In the RBS compensation system 130, in accordance with equations (10a), (10b), if the segment is an RBS segment, then an RBS compensation quantity is mathematically combined with the segment in order to minimize the effects of RBS. In the preferred embodiment, 0.5 LSB is added or subtracted from the segment, depending upon whether the RBS imposes a space LSB or a mark LSB, respectively. If overflow occurs, then the segment indicator N is incremented, or N=N+1. The RBS compensation system 130 of the second embodiment is configured to forward each mu-law code word to the network 113 on connection 112b.

It should be mentioned that both of the first and second embodiments of the combined DAQ/RBS compensation system 130 could be implemented in a single transmitter, and then one or both could be selected and used for operation, based upon feedback received during a test/training session. In this configuration, the selector 194 could be utilized to select, initiate, and control the appropriate embodiment.

B. Initialization—Selection of DAQ and RBS Compensation Quantities

The DAQ compensation quantity G as well as an RBS compensation quantity are selected preferably during an initialization period by the compensation selector 194 (FIGS. 2A, 2B). In this regard, the compensation selector 194 is configured to test different compensation quantities by combining different compensation quantities with different data segments (preferably, in succession), analyzing feedback from a feedback system regarding the accuracy of the received/decoded segment, for example, the cooperative feedback system 210 (FIG. 4) or the noncooperative feedback system 240 (FIG. 5), and selecting an appropriate compensation quantity for normal steady state operation based upon the feedback.

1. Cooperative Feedback System

Figure 4:
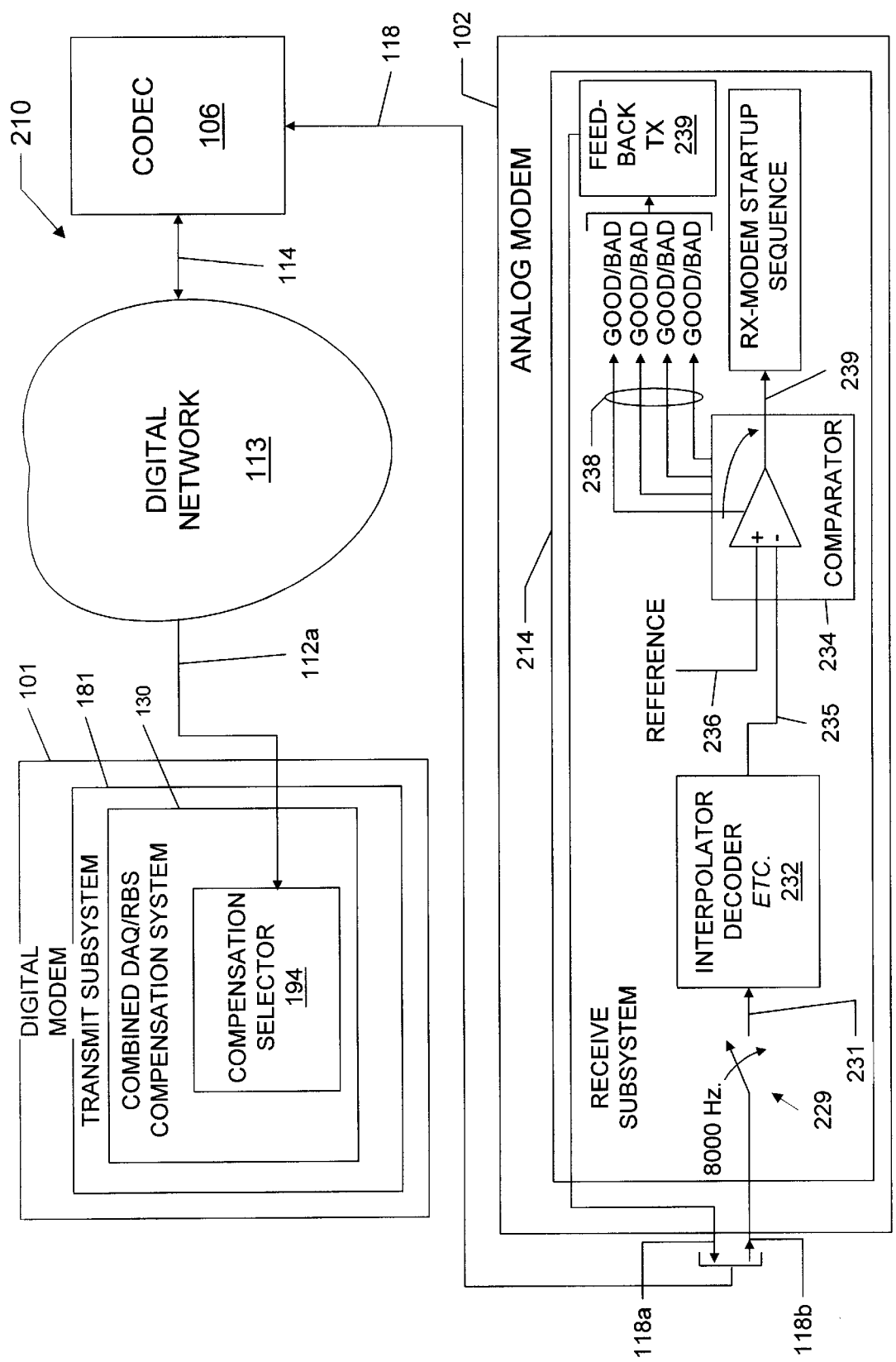
FIG. 4 is an electronic block diagram of a possible implementation of a cooperative feedback system for generating a feedback signal for the compensation systems of FIGS. 2A and 2B during an initialization (training) phase to indicate the quality of a transmitted test signal.

The preferred embodiment of the cooperative feedback system 210 is depicted in FIG. 4, which is merely one example of an implementation of numerous possible designs. The feedback system 210 supplies the feedback signal that is used by the selector 194 to determine the appropriate DAQ compensation quantity G and the polarity and frequency for applying the RBS compensation quantity. The feedback system 210 includes elements in the local transmit subsystem 181 associated with, for example, the modem 101 (FIG. 1), cooperating with elements in a remote receive subsystem 214 associated with, for example, the analog modem 102 (FIG. 1). Furthermore, these elements of the feedback system 210 can be implemented in software, firmware, hardware, or a combination thereof. In embodiments where elements are implemented in software/firmware, they may be stored and transported on any computer-readable medium for use by or in connection with a computer-related system or method. In the preferred embodiment, the elements of the remote receive subsystem 214 that are pertinent to the feedback system 210, as illustrated in FIG. 4, are implemented in software that is stored in memory and that configures and drives a conventional digital signal processor (DSP) situated within the receive subsystem 214.

As shown in FIG. 4, the remote receive subsystem 214 receives the mu-law code words corresponding to the compensated segments of digital data in succession from the connection 118 via a switch 229 at a predefined sampling rate, typically 8000 hertz (Hz), when the connection 118 is a telephone line. The mu-law code words 231 from the switch 229 are passed to standard signal processing components, including an interpolator, a decoder, etc., as denoted collectively by block 232. The decoder is configured to generally demodulate and process the incoming series of linear data words in accordance with any suitable format, such as the V.34 protocol.

A comparator 234 receives the decoded bit stream 235 from the block 232 of components and compares it with a reference 236. In the preferred embodiment, the reference 236 is essentially a bit stream that is substantially free of errors and that should have been received by the remote receive subsystem 214 in the absence of DAQ loss. However, other types of references 236 are possible. For example, in another possible embodiment, a signal-to-noise (S/N) level could be derived from the decoded bit stream 235, and in this case, the reference 236 would be a S/N threshold level, which is compared with the S/N level derived from the incoming signal.

A good/bad indicator 238, such as one or more bits, to indicate whether or not the accuracy of a segment 235 has improved, is generated by the comparator 234 and forwarded to a feedback transmitter 239. The feedback transmitter 239 is adapted to perform any suitable processing of the good/bad indicator 238. In the preferred embodiment, a collection of good/bad indicators 238 or a derivative signal thereof is returned to the compensation selector 194 of the local transmit subsystem 181 via the feedback transmitter 239 situated at the remote receive subsystem 214 and the connection 118. The good/bad indicators 238 may be forwarded together in a single segment, independently, or in groups back to the transmit subsystem 181, whichever is appropriate.

In the preferred embodiment, the remote receive subsystem 214 analyzes each segment independently, reporting back to the local transmit subsystem 181 through the MP Type 1 sequence, which is a portion of the training sequence specified by the V.34 recommendation. Using currently undefined or reserved bits in the MP sequence, an indication as to which segments were improved is relayed back to the local transmit subsystem 181.

With the good/bad indicators 238 from the receive subsystem 214, the compensation selector 194 of the transmit subsystem 181 can select and apply the compensation quantity G and, if necessary, an RBS compensation quantity that improve the accuracy of the received data in order to ultimately allow high speed data transfers between the modems.

As an example of the selection process for determining an appropriate DAQ compensation quantity G by the compensation selector 194, if the remote receive subsystem 214 in the feedback system 210 detects that the transmission of a digital data segment through the digital network 113 and codec 106 results in no DAQ loss to the segment, then the feedback signal relayed to the compensation selector 194 causes the selector 194 to select a compensation quantity G with a value of 1. If the feedback system 210 determines and indicates that a particular compensation quantity G results in a 3 db loss in the digital data segment, then the feedback signal causes the selector 194 to select the compensation quantity G of $1/\sqrt{2}$. A 6 dB loss causes the selection of a compensation quantity of ½, and so on. These compensation quantity values are listed merely as examples, and it can be appreciated by one ordinarily skilled in the art that other appropriate quantities are possible depending on the implementation details, the technique chosen for combining quantities with the digital data, etc.

2. Noncooperative Feedback System

Figure 5:
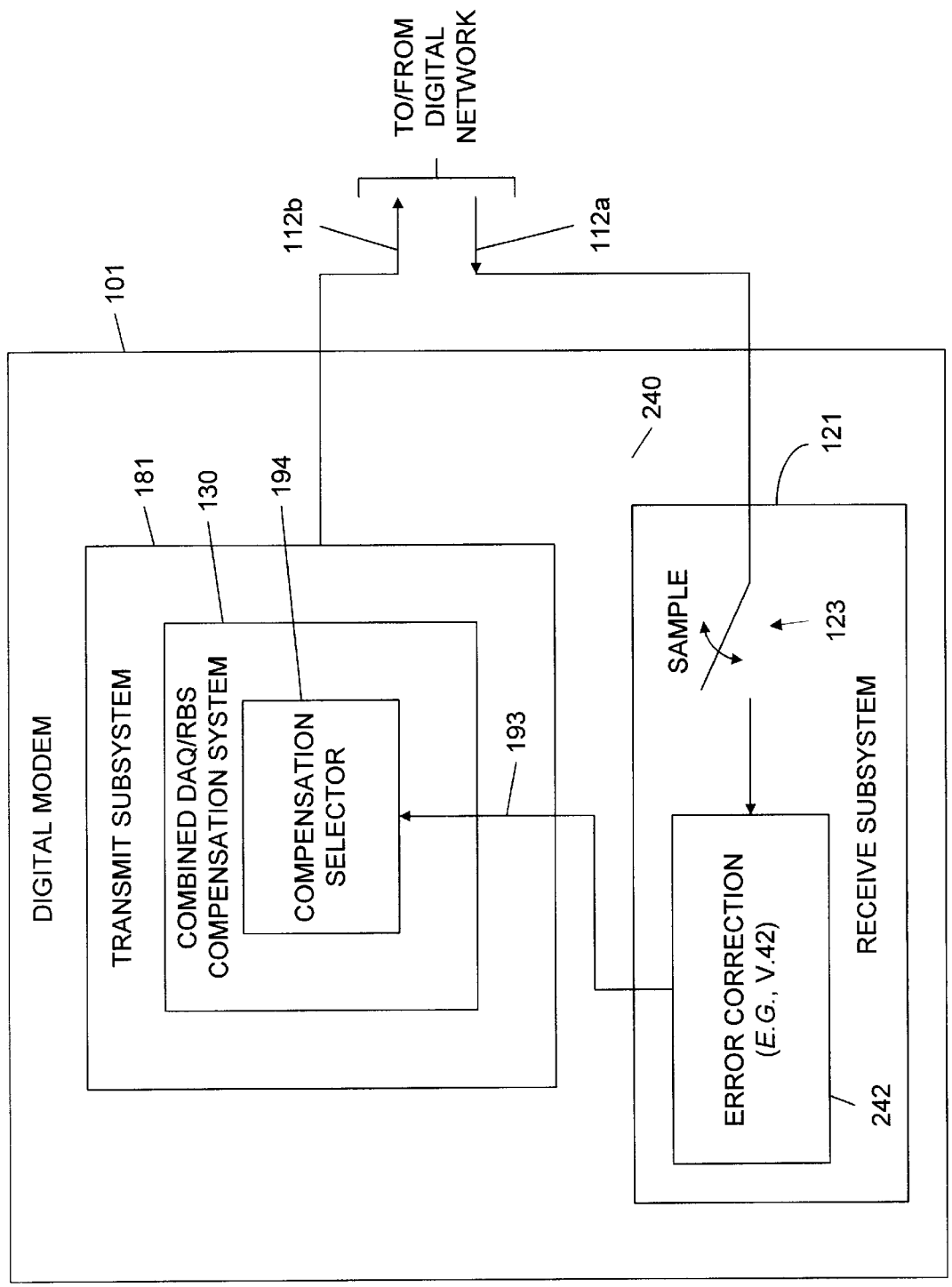
FIG. 5 is an electronic block diagram of a possible implementation of a noncooperative feedback system for generating a feedback signal for the compensation systems of FIGS. 2A and 2B during an initialization (training) phase to indicate the quality of a transmitted test signal.

FIG. 5 is electronic block diagram of the noncooperative feedback system, generally denoted by reference numeral 240. In this example of an implementation, a method for producing feedback (for helping the selector 194 determine the appropriate compensation quantities) involves monitoring requests for block retransmission from the remote modem 102 (FIG. 1). This method can be used, for example, with any modem that uses standard V.42 error correction. An advantage of this method is that it does not require modification of any existing modem and does not require cooperative effort between the transmitting and receiving modems.

More specifically, referring to FIG. 5, the noncooperative feedback system 240 includes elements in the local transmit subsystem 181 corresponding with those shown in FIG. 2A or FIG. 2B and described previously. The local transmit subsystem 181 compensates the segments, one at a time, with different compensations during the initialization phase. After each compensation in a particular segment, the transmit subsystem 181 will dwell for a predetermined time period while the local receive subsystem 121 monitors the channel 112a for retransmission requests. The receive subsystem 121 can be equipped with any suitable error correction mechanism 242 for monitoring retransmission requests. In the preferred embodiment, the error correction mechanism 242 is a standard V.42 error correction mechanism set forth in the industry standard V.42 specification.

In essence, the data rate will increase and the number of retransmission requests will decrease as the compensation parameters approach optimum values. Conversely, the data rate will decrease and the number of retransmission requests will increase as the compensation parameters digress from optimum values. A feedback signal 193, which can be the number of retransmission requests or some other derivative information, is generated by the error correction mechanism 242 and is communicated to the compensation selector 194.

Based upon the feedback 193 from the error correction mechanism 242, the compensation selector 204 can select and implement appropriate compensations, if any.

An advantage of the noncooperative feedback system 240 of FIG. 5 is that no loss of data synchronization ever occurs. The system 240 also works with any vender's product that supports automatic rate control, V.42 bis error correction, or other error correcting protocols.

C. Software

The combined DAQ/RBS compensation system 130 can be implemented in software. In embodiments where the system 130 is implemented in software, it may be stored and transported on any computer-readable medium for use by or in connection with a computer-related system or method. One possible implementation of the software version for the system 130, which is meant as merely an example, is set forth hereafter.

```
lin2mu:
    a0=a0>>1
    a0=a0>>1        /* right justify 14 bits */
    a0=rnd(a0)      /* round 14 bit value */
    a0=a0<<1        /* left justify 14 bits */
    a0=a0<<1        /* a0h = Sddd dddd dddd dd00 */
    y=0x8000        /* mask for sign bit */
                    /* y = 1000 0000 0000 0000 */
    a1=a0&y         /* a1h = S000 0000 0000 0000 */
    if ne a0=-a0    /*if negative take 2s complement */
                    /* input data in-place in a0h */
/* Begin Digital attenuation quantization Loss Compensation */
    r0=d_loss1      /* Get loss sealer table pointer */
    pt=*r0
    y=a0    x=*pt++
d_lossin:
    p=x*y   *r3=a1
    a1=p
    y=132           /* y= 0000 0000 1000 0100 */
                    /* bias value (33) shifted left by 2 */
                    /* bits to compensate for the 14 bit */
```

```
                         /* input data being left justified */
        a1=a1+y          /* a0h += 0000 0000 1000 0100 */
                         /* *linmu = S000 0000 0000 0000 */
        c1=-8            /* initialize counter 1 for finding */
                         /* the segment */
   do 8   {              /* determine the segment number */
        ifc pl al=a1<<1  /* (exponent) and the */
        }                /* compressed code word into place */
                         /* a0h = 1ccc cxxx xxxx xxxx */
        a1=a1>>8
        x=a1             /* Temp store of a1 data */
        a1=c2            /* Move c2 to c0 */
        c0=a1
        c1=-1            /* Set c1 for no RBS */
        r0=d_loss2       /* Read RBS indentifier bits */
        a1=*r0
        a1=a1<<1         /* Shift next bit to msb */
        *r0=a1           /* Save RBS identifier */
        a1=x             /* Restore a1 */
        if pl goto lin2mu05  /* No changes if msb=0 */
        a1=*r0
        y=0x200          /* RBS identifier bit */
        a1=a1|y          /* Reset RBS identifier */
        *r0=a1           /* Save RBS identifier */
        a1=x             /* Restore a1 */
        y=4
        a1=a1+y          /* combine 0.5 LSB */
        y=0x80           /* Test for negative result */
        a1&y
        if ne goto lin2mu05  /* Jump if no segment change */
        cl=0             /* clear cl for segment change */
   lin2mu05:
        y=0x78
        a1=a1&y
        y=132            /* put 1s before and after the */
        a1=a1+y          /* compressed code word */
                         /* a1h = 0000 0000 001c ccc1 */
        if c1ge a1=a1<<1 /* Shift if segment change */
   do 71  {              /* the formatted compressed */
        ifc0lt a1=a1<<1  /* code word into place, i.e. */
        }                /* apply exponent (segment) */
                         /* a1h = 00 0000 0001c ccc1 seg = 0 */
                         /* a1h = 00 0000 01cc cc10 seg = 1 */
                         /* a1h = 00 0000 1ccc c100 seg = 2 */
                         /* a1h = 00 0001 cccc 1000 seg = 3 */
                         /* a1h = 00 001c ccc1 0000 seg = 4 */
                         /* a1h = 00 01cc cc10 0000 seg = 5 */
                         /* a1h = 00 1ccc c100 0000 seg = 6 */
                         /* a1h = 01 cccc 1000 0000 seg = 7 */
        a1=a1-y          /* a1h -= 0x21 subtract bias (33) */
        y=a1 x=*pt++
        p=x*y
        a0=p
   /* End Digital attenuation quantization Loss Compensation */
   /*End */
        y=132            /* y = 0000 0000 1000 0100 */
                         /* bias value (33) shifted left by 2 */
                         /* bits to compensate for the 14 bit */
                         /* input data being left justified */
        a0=a0+y          /* a0h += 0000 0000 1000 0100 */
                         /* *linmu = S000 0000 0000 0000 */
        c1=-8            /* initialize counter 1 for finding */
                         /* the segment */
   do 8   {              /* determine the segment number */
        ifc pl a0=a0<<1  /* (exponent) and the */
        }                /* compressed code word into place */
                         /* a0h = 1ccc cxxx xxxx xxxx */
        a0=a0>>4         /* the compressed code word */
        a0=a0<<1         /* into place */
                         /* a0h = 1111 cccc xxxx xxxx */
        a1=c2            /* c2 = negative segment number */
        a1=-a1           /* a1h = segment number */
                         /* a1h = 0000 0000 0000 0eee */
        a1=a1<<4         /* segment number into place */
        a1=a1<<8         /* a1h = 0eee 0000 0000 0000 */
        y=0x0f00         /* mask for compressed code word */
                         /* y = 0000 1111 0000 0000 */
        a0=a0&y          /* a0h = 0000 cccc 0000 0000 */
        y=a1             /* y = 0eee 0000 0000 0000 */
        a0=a0+y  y=*r3   /* add segment number to a0h */
                         /* a0h = 0eee cccc 0000 0000 */
                         /* y = S000 0000 0000 0000 */
        a0=a0+y          /* add sign bit to a0h */
                         /* a0h = Seee cccc 0000 0000 */
        a0=a0>>8         /* to low byte of a0h */
                         /* a0h = xxxx xxxx Seee cccc */
        y=0x00ff         /* mask for 8 bit Mulaw value */
        a0=a0&y          /* mask 8-bits to insure removal of */
                         /* sign extension */
                         /* a0h = 0000 0000 Seee cccc */
        a0=a0^y          /* invert bits to provide an inverted*/
                         /* Mulaw value in low byte of a0h */
        return
   d_losstbl:
        int 1.0, 1.0, 0.5, 0x7fff, 0.7071, 1.4142
                  END OF CODE
```

Many variations and modifications may be made to the preferred embodiment of the invention without departing substantially from the spirit and principles of the invention. All such modifications and variations are intended to be included herein within the scope of the present invention, as is defined by the following claims.

In the claims set forth hereinafter, the structures, materials, acts, and equivalents of all "means" elements and "logic" elements are intended to include any structure(s), material(s), or act(s) for performing the functions specified in connection with said elements.

Therefore, the following is claimed:

1. A transmitter for reducing loss in a digital signal that is imposed by digital attenuation quantization (DAQ) and rob bit signaling (RBS) in a network, comprising:

DAQ compensation means for modifying digital data, prior to transmission, so that DAQ loss imposed upon said digital data by communication through a network is reduced; and RBS compensation means for modifying said digital data, prior to said transmission, so that RBS loss imposed upon said digital data by RBS in said network is reduced.

2. The transmitter of claim 1, wherein said DAQ compensation means comprises a means for combining a DAQ compensation quantity with each digital data segment and wherein said RBS compensation means comprises a means for combining an RBS compensation quantity with each digital data segment that will be affected by said RBS in said network.

3. The transmitter of claim 2, further comprising:

a feedback mechanism configured to produce a feedback signal; and a compensation selector configured to receive said feedback control signal and to produce said DAQ compensation quantity and said RBS compensation quantity based upon said feedback signal.

4. The transmitter of claim 1, further comprising:

a first adjustment mechanism for combining a DAQ compensation quantity with an amplitude of a data segment to be transmitted to said network in order to produce a modified amplitude;

a linear-mu-linear converter configured to receive said modified amplitude from said first adjustment mechanism, said linear-mu-linear converter having:

a linear-mu converter configured to convert said modified amplitude to a mu-law quantity;

an RBS compensation system configured to receive said mu-law quantity and to mathematically combine an RBS compensation quantity with said mu-law quantity when said segment is to be processed with RBS in said network in order to produce an RBS compensated mu-law quantity; and a mu-linear converter configured to convert said RBS compensated mu-law quantity from said RBS compensation system into an RBS compensated linear quantity;

a second adjustment mechanism configured to combine a reciprocal of said DAQ compensation quantity with said RBS compensated linear quantity from said mu-linear converter in order to produce a DAQ/RBS compensated linear quantity; and a linear-mu converter configured to convert said DAQ/RBS compensated linear quantity into a DAQ/RBS compensated mu-law quantity for transmission to said network.

5. The transmitter of claim 1, further comprising:

a first adjustment mechanism for combining a DAQ compensation quantity with an amplitude of a data segment to be transmitted to said network in order to produce a modified amplitude;

a linear-mu-linear converter configured to receive said modified amplitude from said first adjustment mechanism, said linear-mu-linear converter having:
 a linear-mu converter configured to convert said modified amplitude to a mu-law quantity; and
 a mu-linear converter configured to convert said mu-law quantity from said linear-mu converter into a linear quantity;

a second adjustment mechanism configured to combine a reciprocal of said DAQ compensation quantity with said linear quantity from said mu-linear converter in order to produce a DAQ compensated linear quantity;

a linear-mu converter configured to convert said DAQ compensated linear quantity into a DAQ compensated mu-law quantity; and an RBS compensation system configured to receive said DAQ compensated mu-law quantity and to mathematically combine an RBS compensation quantity with said DAQ compensated mu-law quantity when said segment is to be processed by RBS in said network in order to produce a DAQ/RBS compensated quantity for transmission.

6. The transmitter of claim 1, further comprising a means for providing feedback to advise both said DAQ compensation means and said RBS compensation means how to modify said digital data.

7. The transmitter of claim 1, implemented in software that is stored in a computer readable medium and executed by a digital signal processor.

8. A computer readable medium having a program for reducing digital loss associated with transmitting a digital signal through a network, the program comprising:

digital attenuation quantization (DAQ) loss compensation logic configured to modify digital data, prior to transmission, so that DAQ loss imposed upon said digital data by communication through a network is reduced; and rob bit signaling (RBS) compensation logic configured to modify said digital data, prior to said transmission, so that RBS loss imposed upon said digital data by RBS in said network is reduced.

9. The medium of claim 8, further comprising:

logic for combining said DAQ compensation quantity with an amplitude of a data segment to be transmitted to said network in order to produce a modified amplitude;

logic for converting said modified amplitude to a mu-law quantity;

logic for combining said RBS compensation quantity with said mu-law quantity when said segment is to be processed with RBS in said network in order to produce an RBS compensated mu-law quantity;

logic for converting said RBS compensated mu-law quantity into a linear quantity;

logic for combining a reciprocal of said DAQ compensation quantity with said linear quantity from said mu-linear converter in order to produce a DAQ/RBS compensated linear quantity; and logic for converting said DAQ/RBS compensated linear quantity into a DAQ/RBS compensated mu-law quantity for transmission to said network.

10. The medium of claim 8, further comprising:

logic for combining said DAQ compensation quantity with an amplitude of a data segment to be transmitted to said network in order to produce a modified amplitude;

logic for converting said modified amplitude to a mu-law quantity;

logic for converting said mu-law quantity into a linear quantity;

logic for combining a reciprocal of said DAQ compensation quantity with said linear quantity from said mu-linear converter in order to produce a DAQ compensated linear quantity;

logic for converting said DAQ compensated linear quantity into a DAQ compensated mu-law quantity; and logic for combining an RBS compensation quantity with said DAQ compensated mu-law quantity when said segment is to be processed with RBS in said network in order to produce a DAQ/RBS compensated mu-law quantity for transmission to said network.

11. A method for decreasing loss in a digital signal communicated through a digital network, comprising the steps of:

modifying digital data, prior to transmission, so that digital attenuation quantization (DAQ) loss that is subsequently imposed upon said digital data by a network is reduced by mathematically combining a DAQ compensation quantity to each segment of said digital data;

modifying said digital data, prior to transmission, so that loss resulting from rob bit signaling (RBS) in a network is reduced by mathematically combining an RBS loss compensation quantity with each segment of said digital data that will be modified by RBS; and transmitting said modified digital data to said network.

12. The method of claim 11, further comprising the steps of:

combining said DAQ compensation quantity with an amplitude of a data segment to be transmitted to said network in order to produce a modified amplitude;

converting said modified amplitude to a mu-law quantity;

combining said RBS compensation quantity with said mu-law quantity when said segment is to be processed with RBS in said network;

converting said mu-law quantity into a linear quantity;

combining a reciprocal of said DAQ compensation quantity with said linear quantity from said mu-linear converter in order to produce a compensated linear quantity; and converting said compensated linear quantity into a compensated mu-law quantity for transmission to said network.

13. The method of claim 11, further comprising the steps of:

combining said DAQ compensation quantity with an amplitude of a data segment to be transmitted to said network in order to produce a modified amplitude;

converting said modified amplitude to a mu-law quantity;

converting said mu-law quantity into a linear quantity;

combining a reciprocal of said DAQ compensation quantity with said linear quantity from said mu-linear converter in order to produce a DAQ compensated linear quantity;

converting said DAQ compensated linear quantity into a DAQ compensated mu-law quantity; and combining an RBS compensation quantity with said DAQ compensated mu-law quantity when said segment is to be processed with RBS in said network in order to produce a DAQ/RBS compensated quantity for transmission to said network.

14. A transmitter for increasing accuracy of data communicated through a network, comprising:

a first adjustment mechanism for combining a DAQ compensation quantity with an amplitude of a data segment to be transmitted to said network in order to produce a modified amplitude;

a linear-mu-linear converter configured to receive said modified amplitude from said first adjustment mechanism, said linear-mu-linear converter having:

a linear-mu converter configured to convert said modified amplitude to a mu-law quantity;

an RBS compensation system configured to receive said mu-law quantity and to mathematically combine an RBS compensation quantity with said mu-law quantity when said segment is to be processed with RBS in said network; and a mu-linear converter configured to convert said mu-law quantity from said RBS compensation system into a linear quantity;

a second adjustment mechanism configured to combine a reciprocal of said DAQ compensation quantity with said linear quantity from said mu-linear converter in order to produce a compensated linear quantity; and a linear-mu converter configured to convert said compensated linear quantity into a compensated mu-law quantity for transmission to said network.

15. A transmitter for increasing accuracy of data communicated through a network, comprising:

a first adjustment mechanism for combining a DAQ compensation quantity with an amplitude of a data segment to be transmitted to said network in order to produce a modified amplitude;

a linear-mu-linear converter configured to receive said modified amplitude from said first adjustment mechanism, said linear-mu-linear converter having:

a linear-mu converter configured to convert said modified amplitude to a mu-law quantity; and a mu-linear converter configured to convert said mu-law quantity into a linear quantity;

a second adjustment mechanism configured to combine a reciprocal of said DAQ compensation quantity with said linear quantity from said mu-linear converter in order to produce a compensated linear quantity;

a linear-mu converter configured to convert said compensated linear quantity into a compensated mu-law quantity; and an RBS compensation system configured to receive said mu-law quantity and to mathematically combine an RBS compensation quantity with said mu-law quantity when said segment is to be processed with RBS in said network.

16. A system for minimizing loss due to digital attenuation quantization (DAQ) and rob bit signaling (RBS) that are employed in a digital network, comprising:

means for combining a DAQ compensation quantity with an amplitude of a data segment to be transmitted to said network in order to produce a modified amplitude;

means for converting said modified amplitude to a mu-law quantity;

means for combining said RBS compensation quantity with said mu-law quantity when said segment is to be processed with RBS in said network in order to produce an RBS compensated mu-law quantity;

means for converting said RBS compensated mu-law quantity into a linear quantity;

means for combining a reciprocal of said DAQ compensation quantity with said linear quantity from said mu-linear converter in order to produce a DAQ/RBS compensated linear quantity; and means for converting said DAQ/RBS compensated linear quantity into a DAQ/RBS compensated mu-law quantity for transmission to said network.

17. A system for minimizing loss due to digital attenuation quantization (DAQ) and rob bit signaling (RBS) that are employed in a digital network, comprising:

means for combining a DAQ compensation quantity with an amplitude of a data segment to be transmitted to said network in order to produce a modified amplitude;

means for converting said modified amplitude to a mu-law quantity;

means for converting said mu-law quantity into a linear quantity;

means for combining a reciprocal of said DAQ compensation quantity with said linear quantity from said mu-linear converter in order to produce a compensated linear quantity; and means for converting said compensated linear quantity into a DAQ compensated mu-law quantity; and means for combining an RBS compensation quantity with said DAQ compensated mu-law quantity when said segment is to be processed with RBS in said network in order to produce a DAQ/RBS compensated mu-law quantity.

* * * * *